United States Patent [19]

Bezman

[11] 4,374,647
[45] Feb. 22, 1983

[54] OXYGENATED FUEL DEHYDRATION

[75] Inventor: Susan A. Bezman, Point Richmond, Calif.

[73] Assignee: Chevron Research Company, San Francisco, Calif.

[21] Appl. No.: 277,294

[22] Filed: Jun. 25, 1981

[51] Int. Cl.³ .............................................. C10L 1/22
[52] U.S. Cl. ...................................... 44/56; 568/916; 568/917
[58] Field of Search .................... 44/56; 568/916, 917; 260/17.4 ST

[56] References Cited

U.S. PATENT DOCUMENTS

| | | | |
|---|---|---|---|
| 1,412,233 | 4/1922 | Ellis | 44/56 |
| 3,455,664 | 7/1969 | Rosscup et al. | 44/56 |
| 3,793,379 | 2/1974 | Rosscup et al. | 260/641 |
| 4,134,863 | 1/1979 | Fanta et al. | 260/17.4 ST |
| 4,156,664 | 5/1979 | Skinner et al. | 260/17.4 ST |
| 4,159,260 | 6/1979 | Jones et al. | 260/17.4 ST |
| 4,251,231 | 2/1981 | Baird | 44/56 |

OTHER PUBLICATIONS

R. T. Meyers, "Ethanol as a Fuel", Chemical Engineering News, Apr. 28, 1980, pp. 4–5.
S. Arora, "Recovering Alcohol", Chemical Engineering News, Jul. 21, 1980, p. 4.
A. P. Gelbein, "Feasibility of Gasohol", Chemical Engineering News, Sep. 1, 1980, p. 2.
D. F. Othmer, "Ethanol as a Motor Fuel", Chemical Engineering News, Sep. 8, 1980, p. 4.
Fanta et al., "Liquid-Phase Dehydration of Aqueous Ethanol-Gasoline Mixtures", Science, vol. 210, Nov. 7, 1980.

Primary Examiner—Charles F. Warren
Assistant Examiner—Y. Harris-Smith
Attorney, Agent, or Firm—D. A. Newell; S. R. La Paglia; S. H. Roth

[57] ABSTRACT

A method for dehydrating an oxygenated fuel composition comprising at least one gasoline blending hydrocarbon component, isopropanol and water by contacting the composition with HSPAN.

6 Claims, No Drawings

OXYGENATED FUEL DEHYDRATION

BACKGROUND OF THE INVENTION

The present invention relates to the production of oxygenated fuels. Specifically, the invention relates to the removal of excess residual water from an oxygenated fuel composition comprising isopropanol and gasoline.

There is a great need to produce high-octane gasoline. However, the use of the traditional lead-containing gasoline additives has been largely discontinued. So, oxygenated compounds such as ethanol, isopropanol and methyl-t-butyl ether which are high-octane components are now finding their way into the motor gasoline pool.

In making alcohols, particularly, isopropanol, by the direct hydration of olefins, the raw product from the hydration reactor generally contains a substantial quantity of water in addition to the alcohol. Dehydration of the aqueous alcoholic solution has generally required energy intensive procedures such as extractive distillation or azeotropic distillation.

In my U.S. applications entitled "Extractive Blending Process," "Continuous Extractive Blending Process" and "Improved Extractive Blending Process," filed concurrently herewith and incorporated by reference herein, are disclosed processes for simultaneously removing alcohols from aqueous solutions and blending them with a gasoline blending hydrocarbon component. Even when using these methods, there is sometimes too much water left in the resulting alcohol-gasoline blend. The present invention provides a process for dehydrating such alcohol-gasoline blends, particularly isopropanol-gasoline blends, produced by extractive blending or any other methods.

SUMMARY OF THE INVENTION

The present invention relates to a method for dehydrating an oxygenated fuel composition which comprises at least one gasoline blending hydrocarbon component, isopropanol and water. The method comprises contacting the fuel composition with saponified starch-g-polyacrylonitrile (HSPAN) which dehydrates the fuel without loss of isopropanol.

DESCRIPTION OF THE PREFERRED EMBODIMENTS

The present invention is a method of removing residual water from an oxygenated fuel composition which comprises at least one gasoline blending hydrocarbon component, isopropanol (IPA) and water. The method comprises contacting the fuel composition with saponified starch-g-polyacrylonitrile (HSPAN) which selectively absorbs the water to dehydrate the fuel composition.

The gasoline blending hydrocarbon component may be any hydrocarbon that can be added to the gasoline pool, including straight run, FCC gasoline, alkylate, reformate, or their mixtures such as Chevron Unleaded Regular gasoline (ULR). The gasoline blending hydrocarbon may also comprise diesel and/or jet fuels.

HSPAN is a saponified starch-g-polyacrylonitrile polymer which can absorb many times its own weight of water. HSPAN is available from Henkel Corporation. In addition, Staley Stasorb 372, manufactured by A. E. Staley Mfg. Co., Decatur, Illinois, is considered equivalent to HSPAN for the purpose of the invention.

The oxygenated fuel compositions suitable for dehydration in accordance with the present invention contain about 5% to 30% isopropanol, preferably about 5% to 10% and up to about 5% residual water. Such compositions are typically produced by the extractive blending techniques described in the above-mentioned patent applications.

In one embodiment of the present invention, the contacting between the fuel composition and the HSPAN is accomplished by a static treatment. In this embodiment, the fuel composition and HSPAN are mixed in a vessel and allowed to stand for a predetermined time. The weight ratio of fuel composition to HSPAN should be from about 2:1 to 100:1, preferably about 5:1 to 10:1.

In another embodiment, the contacting between the fuel composition and HSPAN is accomplished by a fast flow column treatment. In this embodiment, the oxygenated fuel composition is allowed to pass through a container, e.g., a column, in which a quantity of HSPAN has been placed. The fuel composition may be passed very rapidly through the column. Space velocities of as high as about 1800 $Hr^{-1}$ were found to be effective. The space velocity is not limiting factor since most commercial processes employ space velocities of from about 1 to 5 $Hr^{-1}$.

EXAMPLES

The following examples are intended to demonstrate the practice and advantages derived from the present invention. They are not intended to be construed as a limitation thereon.

The results discussed herein are set forth in the following Table I.

TABLE I

| REMOVAL OF RESIDUAL WATER FROM IPA/ULR BLENDS VIA HSPAN TREATMENT | | | |
|---|---|---|---|
| Case | 1 | 2 | 3 |
| Volume ULR/Volume IPA-$H_2O$ Azeotrope Extraction Mixture | 10:1 | 5:1 | 2.5:1 |
| Wt/Vol ULR | 745 g/1000 cc | 375 g/500 cc | 375 g/500 cc |
| Wt/Vol of 87.8% IPA-12.2% $H_2O$ Azeotrope | 79.5 g/100 cc | 80.7 g/100 cc | 161.2 g/200 cc |
| Composition of Hydrocarbon Phase After Extraction (Wt % ULR/IPA/$H_2O$) | | | |
| A. After Gravity Separation of Phases | 91.3/8.3/0.41 | 83.5/15.3/1.2 | 70.4/26.3/3.3 |
| B. After Filter-Coalescer Treatment | NA/NA/0.35 | NA/NA/1.1 | NA/25.2/3.2 |
| C. Filtered + Fast Flow Column Treatment of 21 g Liquid with 7.9 g HSPAN | 91.6/8.3/0.10 | — | — |
| D. Filtered + 24-Hr Static Treatment of 21 g Liquid with 7.9 g HSPAN | 92.1/7.8/0.10 | NA/NA/0.28 | 78.4/20.9/0.67 |
| E. Filtered + Fast Flow Column Treatment of 21 g Liquid with 0.2 g HSPAN | — | NA/NA/0.39 | 78.6/20.6/0.75 |
| F. Filtered + Fast Flow Column Treatment of | | | |

TABLE I-continued

REMOVAL OF RESIDUAL WATER FROM
IPA/ULR BLENDS VIA HSPAN TREATMENT

| Case | 1 | 2 | 3 |
|---|---|---|---|
| 21 g Liquid with 0.2 g HSPAN | — | NA/NA/0.60 | 74.1/23.8/2.1 |

NA = Not Analyzed

The hydrocarbon phase produced by extractive blending of isopropanol out of its isopropanol-water azeotrope with a gasoline blending hydrocarbon component has a residual water content which depends on the relative volumes of hydrocarbon and azeotrope used in the blending process. Table I, Line A, sets forth the compositions of the hydrocarbon phases obtained using 10:1, 5:1, and 2.5:1 hydrocarbon [unleaded regular (ULR)]-azeotrope volume ratios during extractive blending.

Table I, Line B, shows the effect of passing the hydrocarbon phase of Line A through a Racor Model 2000SM Filter Separator.

The resulting oxygenated fuel compositions were treated as follows:

Line C—21 g of filtered blend were passed rapidly through a 7.9 g column of HSPAN (LHSV ~1800 Hr$^{-1}$).

Line D—21 g of filtered blend were shaken for 10 minutes with 7.9 g HSPAN; the mixture was allowed to stand undisturbed for 24 hours.

Line E—21 g of the filtered bland were passed rapidly through a 2 g column of HSPAN.

Line F—21 g of the filtered blend were passed through a 0.2 g column of HSPAN.

From Table I, it appears that for all three volume ratios tested, HSPAN was very effective in greatly reducing the amount of residual water in the gasoline-isopropanol blend (79%–34% reductions achieved). The use of larger quantities of HSPAN per volume of blend tended to increase the effectiveness of water removal. The use of larger quantities, however, would increase the amount of HSPAN that would have to be dried and regenerated. The amount of HSPAN employed will, therefore, depend on a cost-benefit analysis and the amount of water that is tolerable in the blend.

The most significant reduction in water content occurred in Case 1 (10:1 gasoline-azeotrope ratio) where HSPAN treatment reduced the water content from 0.35% to 0.10%, even at a very short contact time. This is especially significant since the isopropanol content in these samples is about that which has already received EPA approval (7.5 wt. % isopropanol is allowed).

A comparison of Lines C and D for Case 1 shows that the rate of water absorption is very rapid. Also, loss of isopropanol from the blend by coabsorption into the HSPAN is observed only with very long contact times (e.g., Case 1, Line D) or with very low ratios of gasoline to isopropanol (i.e., very high IPA content in the blend—Case 3, Lines B and D).

COMPARATIVE EXAMPLE

Extraction mixtures comprising 50 cc of a 90%–10%, ethanol-water solution and 500 cc of Chevron Unleaded Regular gasoline were treated as set forth in the following Table II.

TABLE II

| | | Hydrocarbon Layer | |
|---|---|---|---|
| Run | Treatment | Ethanol (Wt. %) | Water (Wt. %) |
| A | Gravity Separation of Phases | 7.12 | 0.40 |
| B | Filter Coalescer Treatment | 6.81 | 0.40 |
| C | Filtered and Fast Flow Column (HSPAN) | 7.23 | 0.19 |
| D | Fast Flow Column (HSPAN) | 7.19 | 0.21 |

From Table II, it is evident that HSPAN is more effective to remove residual water from an isopropanol-containing oxygenated fuel composition than from one containing ethanol. In addition, it is not necessary to allow the emulsion to separate before dehydrating the blend, although prior phase separation by filter coalescer treatment is preferred.

Although the present invention has been described with reference to specific examples and embodiments, it is clear that many modifications are possible without departing from the scope of the invention which is defined by the appended claims.

I claim:

1. A method for dehydrating a fuel composition which comprises at least one gasoline blending hydrocarbon component, isopropanol and water, the method comprising contacting the fuel composition with a saponified starch-g-polyacrylonitrile polymer, wherein the weight ratio of fuel consumption to polymer is from about 2:1 to 100:1.

2. The method of claim 1, wherein the ratio is from about 5:1 to 10:1.

3. The method of claim 1, wherein the composition is in the form of an emulsion.

4. The method of claim 1, wherein the contacting is accomplished by passing the fuel composition through a column containing the polymer.

5. The method of claim 4, wherein the fuel composition is passed through the column at a liquid hourly space velocity of from about 1 to 5.

6. The method of claim 1, wherein the composition comprises from about 65 to 95 wt. % of said at least one gasoline blending hydrocarbon component, from about 5 to 30 wt. % of isopropanol and from about 0 to 5 wt. % of water.

* * * * *

UNITED STATES PATENT AND TRADEMARK OFFICE
CERTIFICATE OF CORRECTION

PATENT NO. : 4,374,647
DATED : February 22, 1983
INVENTOR(S) : Susan A. Bezman

It is certified that error appears in the above—identified patent and that said Letters Patent are hereby corrected as shown below:

Col. 2, line 40, "not limiting" should read --not a limiting--.

Col. 1, Table I, E., "21 g Liquid with 0.2 g HSPAN" should read --21 g Liquid with 2.0 g HSPAN--.

Col. 3, line 32, "bland" should read --blend--.

Col. 4, line 43, Claim 1, "fuel consumption" should read --fuel composition--.

Signed and Sealed this

Twenty-fourth Day of May 1983

[SEAL]

Attest:

DONALD J. QUIGG

Attesting Officer  Acting Commissioner of Patents and Trademarks